US008737046B2

(12) United States Patent
Kim et al.

(10) Patent No.: US 8,737,046 B2
(45) Date of Patent: May 27, 2014

(54) IMAGE FORMING APPARATUS

(75) Inventors: Gun Wook Kim, Suwon-si (KR); Jin Ho Park, Yongin-si (KR); Kwoang Joe Seorl, Yongin-si (KR); Byung Jo Lee, Bucheon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 136 days.

(21) Appl. No.: 12/969,886

(22) Filed: Dec. 16, 2010

(65) Prior Publication Data

US 2011/0157795 A1 Jun. 30, 2011

(30) Foreign Application Priority Data

Dec. 24, 2009 (KR) ........................ 10-2009-0131122

(51) Int. Cl.
*H05K 5/00* (2006.01)

(52) U.S. Cl.
USPC ..................................... 361/679.01; 361/810

(58) Field of Classification Search
USPC .............. 361/679.01; 399/379, 380; 358/400, 358/401, 471, 474, 500, 501
See application file for complete search history.

(56) References Cited

U.S. PATENT DOCUMENTS

| 3,537,106 | A | * | 10/1970 | Crawford et al. ................ 352/79 |
| 4,432,639 | A | * | 2/1984 | Saitou et al. ..................... 355/75 |
| 5,225,917 | A | * | 7/1993 | Osako ............................ 358/498 |
| 2009/0218472 | A1 | * | 9/2009 | Takemoto ....................... 248/542 |

FOREIGN PATENT DOCUMENTS

| JP | 2002-190888 | | 7/2002 | |
| JP | 2002-229292 | * | 8/2002 | ............. G03G 15/00 |

* cited by examiner

*Primary Examiner* — Tuan T Dinh
*Assistant Examiner* — Mukund G Patel
(74) *Attorney, Agent, or Firm* — Stanzione & Kim, LLP (57) ABSTRACT

An image forming apparatus includes a body frame and an image reading unit mounted to the body frame. The image forming apparatus further includes a plurality of fixed supporting portions to which the image reading unit is mounted in a stationary manner, an unfixed supporting member mounted to the body frame in a vertically movable manner to support one side of the image reading unit in a vertically movable manner, and an elastic member to elastically support the unfixed supporting member. The image forming apparatus may prevent the flatness of the image reading unit from being deteriorated when the image reading unit is mounted to the body frame.

15 Claims, 6 Drawing Sheets

IMAGE FORMING APPARATUS

CROSS-REFERENCE TO RELATED APPLICATIONS

This application claims priority under 35 U.S.C. §119(a) from Korean Patent Application No. 2009-0131122, filed on Dec. 24, 2009 in the Korean Intellectual Property Office, the disclosure of which is incorporated herein by reference.

BACKGROUND

1. Field of the General Inventive Concept

Embodiments of the present general inventive concept relate to an image forming apparatus including an image reading unit to read an image from a document.

2. Description of the Related Art

Generally, image forming apparatuses are devised to form an image on a printing medium according to input image signals. Examples of image forming apparatuses include printers, copiers, fax machines, and devices combining functions thereof.

Such an image forming apparatus includes a paper supply unit to supply paper, and an image forming unit to print image information on the paper supplied from the paper supply unit. Recently, some image forming apparatuses include, e.g., an image reading unit to read image information on a document, and an automated document supply unit to enable automated document movement through the image reading unit.

The image forming apparatus contains a body frame to which the above mentioned units are mounted. For example, the paper supply unit and image forming unit may be arranged above and below one another within the body frame, and the image reading unit and automated document supply unit may be installed on the body frame.

SUMMARY

Therefore, it is an feature of the present general inventive concept to provide an image forming apparatus to prevent the flatness of an image reading unit from being deteriorated when the image reading unit is installed to a body frame.

Additional aspects of the general inventive concept will be set forth in part in the description which follows and, in part, will be obvious from the description, or may be learned by practice of the general inventive concept.

In accordance with one feature of the present general inventive concept, an image forming apparatus including a body frame and an image reading unit mounted to the body frame further includes a plurality of fixed supporting portions to which the image reading unit is mounted in a stationary manner, an unfixed supporting member mounted to the body frame in a vertically movable manner to support one side of the image reading unit in a vertically movable manner, and an elastic member to elastically support the unfixed supporting member.

The fixed supporting portions may include first fixed supporting portions protruding from the body frame and each having a central screw-fastening hole.

The image forming apparatus may further include a first mounting member provided at one side of the body frame, to which one side of the image reading unit is mounted, and the first fixed supporting portions may be arranged on an upper surface of the first mounting member.

A pair of the first fixed supporting portions may be spaced apart from each other on the upper surface of the first mounting member.

The image forming apparatus may further include a second mounting member provided at the other side of the body frame, to which the other side of the image reading unit is mounted, and a fixed supporting member fixed to a lateral surface of the second mounting member, and the fixed supporting portions may include a second fixed supporting portion extending laterally from the fixed supporting member to support a lower surface of the image reading unit.

The unfixed supporting member may include at least one unfixed supporting portion extending laterally from the unfixed supporting member to support a lower surface of the image reading unit.

The at least one unfixed supporting portion may include a pair of unfixed supporting portions provided respectively at opposite sides of the unfixed supporting member to support two positions of the lower surface of the image reading unit.

The image forming apparatus may further include a guide hole vertically formed in the body frame, and a guide protrusion protruding from the unfixed supporting member so as to be inserted into the guide hole.

The image forming apparatus may further include a retention hole formed in the body frame, and a retention piece extending from the unfixed supporting member and adapted to penetrate through the retention hole to thereby be caught at a position adjacent to the retention hole, and the retention piece may have a vertical length longer than a vertical length of the retention hole.

The elastic member may include a coil spring, an upper end of which is coupled to the body frame and a lower end of which is coupled to the unfixed supporting member, the elastic member serving to elastically support the unfixed supporting member.

In accordance with another feature of the present general inventive concept, an image forming apparatus including a body frame and an image reading unit mounted to the body frame further includes three fixed supporting portions provided at the body frame, to which three positions of the image reading unit are mounted in a stationary manner, an unfixed supporting member mounted to the body frame in a vertically movable manner to support one side of the image reading unit in a vertically movable manner, and an elastic member to elastically support the unfixed supporting member.

In yet another feature, an image forming apparatus including a body frame to support an image reading unit, comprising an elastic member having a first end coupled to the body frame, and an unfixed supporting member coupled to a second end of the elastic member to elastically support a corner of the image reading unit in a vertical direction.

In another feature, an image forming apparatus including a body frame to support an image reading unit, comprising a first mounting member coupled to the body frame to support a first side of the image reading unit, a support arm coupled to the body frame opposite from the first mounting body to support a second side of the image reading unit that is opposite the first side, and an unfixed supporting member coupled to the support arum and elastically moveable in a vertical direction to elastically support a corner of the second side of the image reading unit.

In still another feature, a support arm of an image forming unit to support a side of an image reading unit, comprising a fixed supporting member formed integrally with the support arm and including a fixed support portion to support a first corner of the side of the image reading unit, and an unfixed supporting member coupled to the support arm and elastically moveable in a vertical direction to elastically support a second corner of the side of the image reading unit different from the first corner.

BRIEF DESCRIPTION OF THE DRAWINGS

These and/or other aspects of the general inventive concept will become apparent and more readily appreciated from the following description of the embodiments, taken in conjunction with the accompanying drawings of which.

DETAILED DESCRIPTION OF THE EMBODIMENTS

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 1:
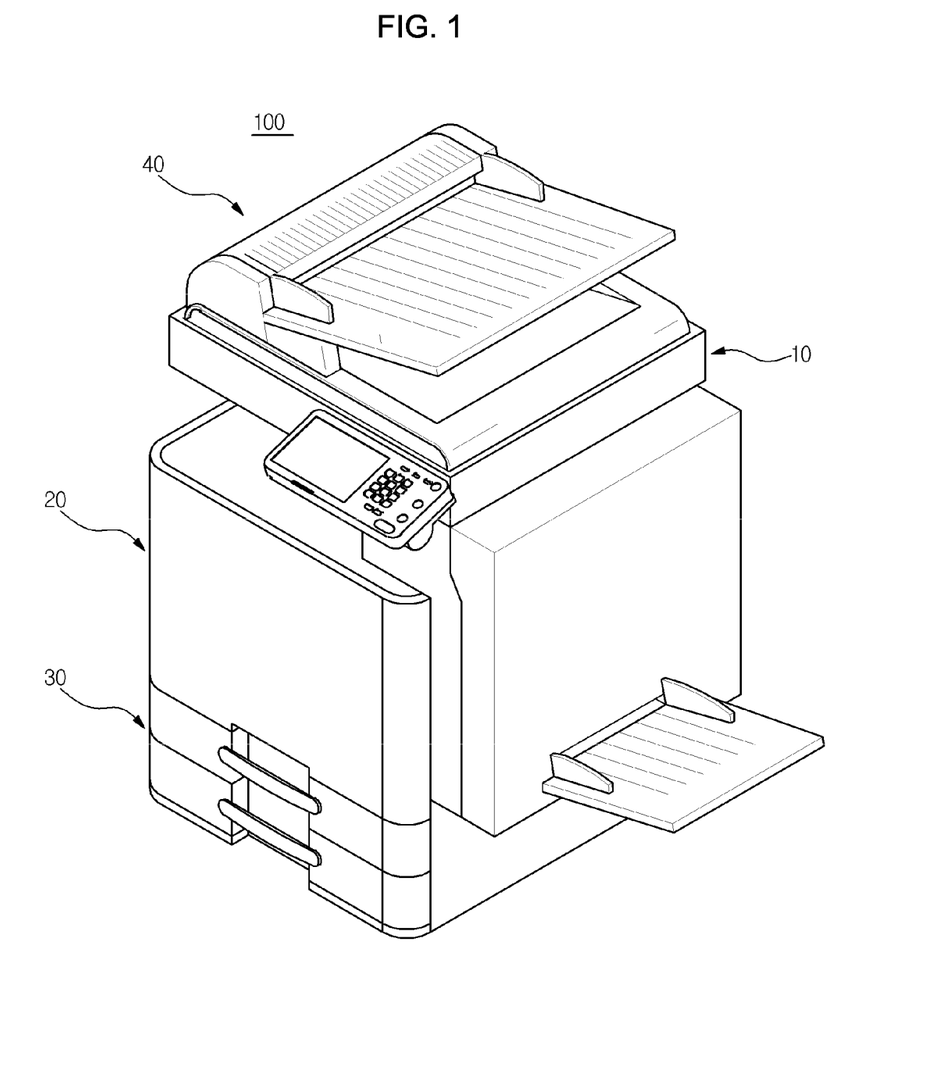
FIG. 1 is a perspective view of an image forming apparatus according to an embodiment of the present general inventive concept.

As illustrated in FIG. 1, an image forming apparatus 100 includes, e.g., an image reading unit 10 to read image information on a document, an image forming unit 20 to print image information, read from the image reading unit 10 or transmitted from an external appliance, such as a personal computer, on a printing medium such as paper, an automated document supply unit 40 to automatically supply documents to enable successive document reading by the image reading unit 10, and a paper supply unit 30 to supply paper to be used in the image forming unit 20.

The image reading unit 10 may be installed above the image forming unit 20 in consideration of use convenience, and the automated document supply unit 40 may be installed on the image reading unit 10 to enable successive document reading by the image reading unit 10. However, the image reading unit 10 is not limited to this exemplary arrangement.

Figure 2:
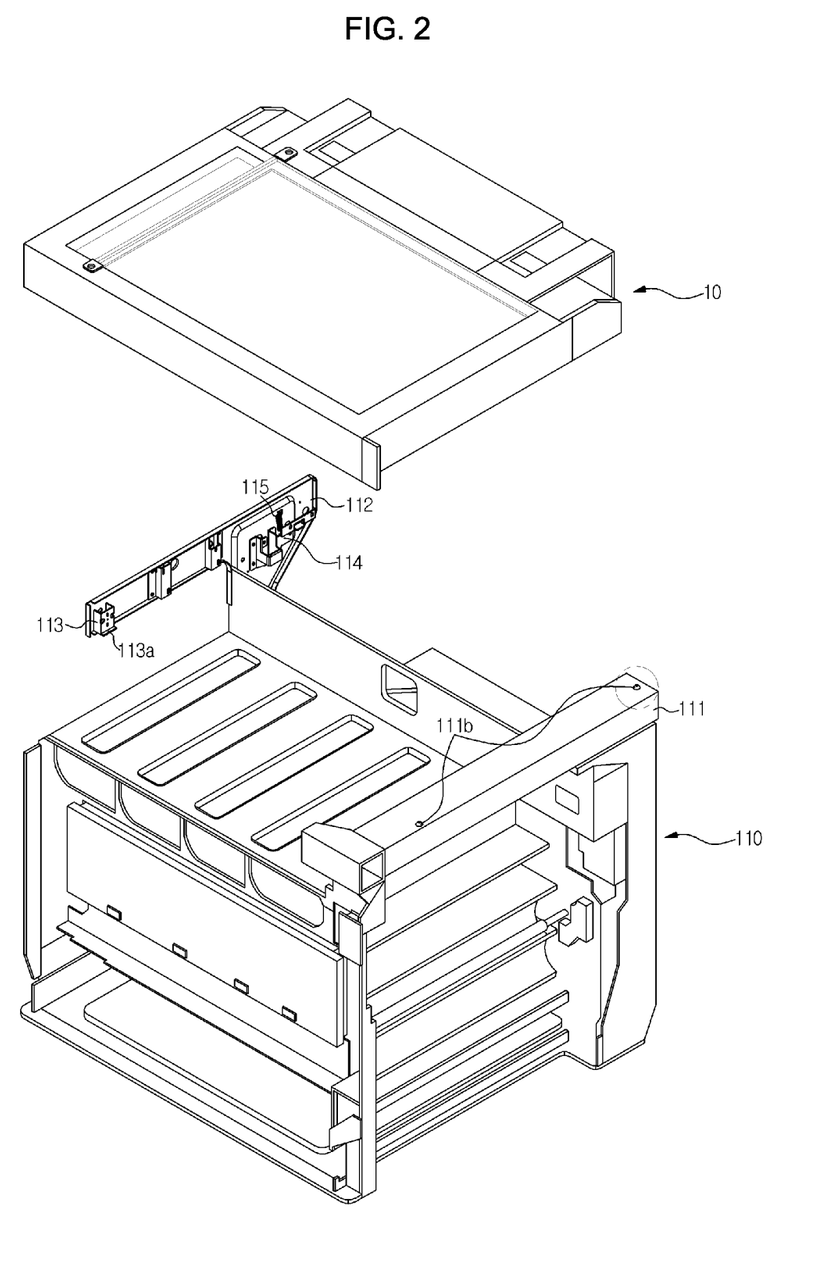
FIG. 2 is a perspective view illustrating an image reading unit and a body frame included in the image forming apparatus according to the embodiment of the present general inventive concept.

Referring now to FIG. 2, at least one exemplary embodiment provides a body frame 110 that is received in the image forming apparatus 100 such that the above mentioned units are mounted to the body frame 110. Specifically, the image forming unit 20 and paper supply unit 30 are arranged above and below one another within the body frame 110, and the automated document supply unit 40 and image reading unit 10 are arranged above and below one another on the body frame 110.

The image reading unit 10 may be independently prefabricated to have an approximately rectangular parallelepiped shape and is mounted on the body frame 110. The body frame 110 is provided at opposite upper ends thereof with a first mounting member 111 and a second mounting member 112, on which opposite sides of the image reading unit 10 are mounted respectively. The first mounting member 111 may be formed integrally with the body frame 110 to support one side of the image reading unit 10. The first mounting member 111 includes at least one fixed supporting portion 111b, as discussed in greater detail below.

Figure 4:
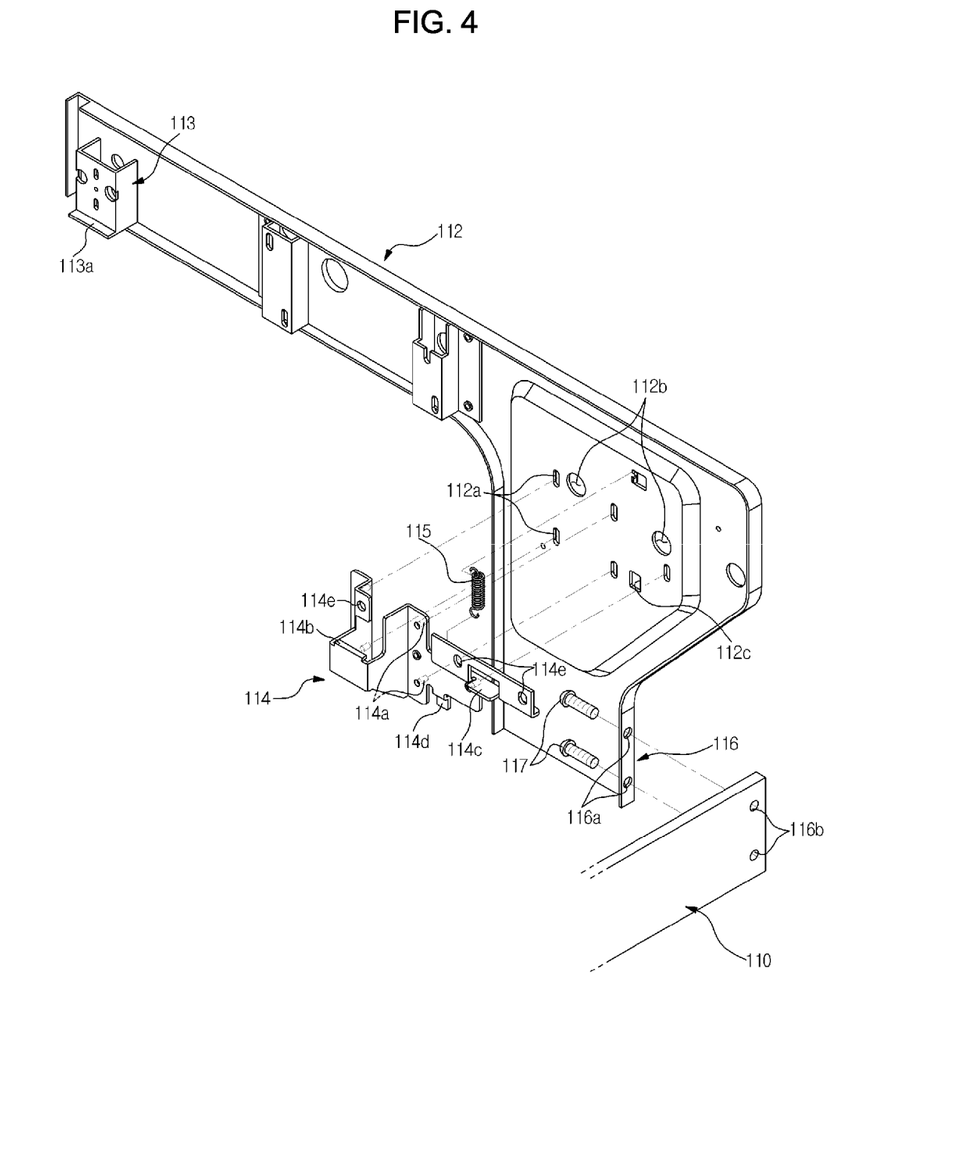
FIG. 4 is a perspective view illustrating an installation configuration of an unfixed supporting member included in the image forming apparatus according to the embodiment of the present general inventive concept.

The second mounting member 112 may be integral with body frame 110, and may be shaped as a support arm to support the opposite side of the image reading unit 10. Alternatively, the second mounting member 112 may be formed as a support arm separate from the body frame 110, and may be coupled to the body frame 110 via, e.g., screws, to support the image reading unit 10. For example, FIG. 4 shows the second mounting member 112 including a mounting side 116 to be disposed against the body frame 110. The mounting side 116 includes eyelets 116a, and the body frame 110 includes corresponding body eyelets 116b to be aligned with the arm eyelets 116a. Screws 117 may be disposed through the arm eyelets 116a and the body eyelets 116b to fasten the second mounting member 112 against the body frame 110.

By supporting the image reading unit 110 with the first mounting member 111 and the second mounting member 112, as discussed in greater detail below, the image reading unit 10 may be formed with a predetermined or more flatness may be necessary to assure the image reading unit 10 to accurately read a document. Accordingly, the image reading unit 10 may be subjected to precise fabrication to realize the predetermined flatness.

However, even if the image reading unit 10 has been precisely fabricated to have the predetermined flatness, the flatness of the image reading unit 10 may be deteriorated due to a tolerance of the body frame 110 when the image reading unit 10 is mounted to the body frame 110. That is, the flatness of the image reading unit 10 may be deformed during an installation process.

Therefore, to prevent the flatness of the image reading unit 10 from being deteriorated when the image reading unit 10 is mounted to the body frame 110, three points of the image reading unit 10, i.e. three positions adjacent to three of the four corners of the image reading unit 10 are supported in a stationary manner by three corresponding support areas, i.e., positions, of the body frame 110.

Figure 3A:
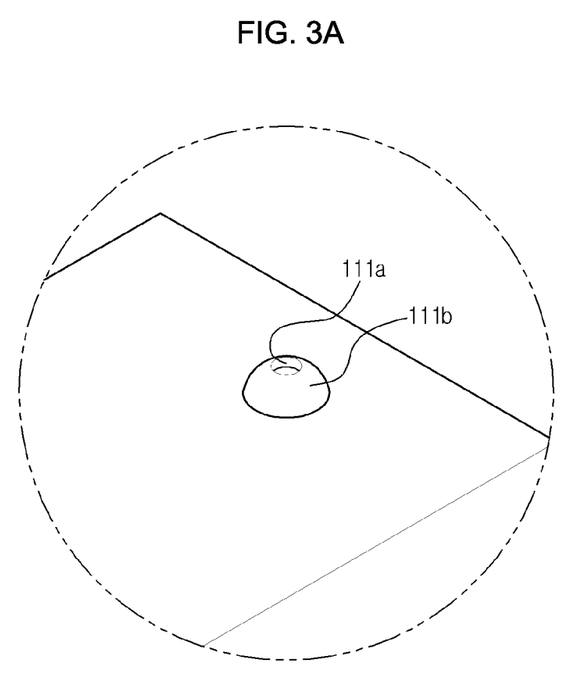
FIG. 3A is a perspective view illustrating a fixed supporting portion included in the image forming apparatus according to the embodiment of the present general inventive concept.

The position adjacent to the remaining one corner of the image reading unit 10 is supported by the body frame 110 in a vertically movable manner. Accordingly, as illustrated in FIGS. 3 and 4, the body frame 110 may include the first mounting member 111 having two first fixed supporting portions 111b disposed thereon. The body frame 110 further includes the second mounting member 112 located opposite from the first mounting member 111. The second mounting member 112 includes a fixed supporting member 113 having a second fixed supporting portion 113a. The fixed supporting member 113 is described in greater detail below. Each of the three fixed supporting portions 111b and 113a may support the image reading unit 10 in a stationary manner.

The body frame 110 further includes an unfixed supporting member 114 and an elastic member 115. The unfixed supporting member 114 is coupled in a vertically movable manner to the body frame 110 and includes unfixed supporting portions 114b and 114c to support one side of the image reading unit 10. The elastic member 115 includes, but is not limited to, a coil spring having an upper end of coupled to the body frame 110 and a lower end of coupled to the unfixed supporting member 114. Accordingly, the elastic member 115 serves to elastically support the unfixed supporting member 114 in an upward direction.

As described above, if three points adjacent to the three corners of the image reading unit 10 are supported in a stationary manner by the body frame 110 via the first fixed supporting portions 111b and the second fixed supporting portion 113a, the image reading unit 10 may realize not only a reliable three-point support structure, but also an elastic support structure because the position adjacent to the remaining one corner of the image reading unit 10 is elastically supported in an upward direction upon receiving an elastic restoration force from the elastic member 115 owing to the unfixed supporting portions 114b and 114c. Accordingly, with the elastic restoration force of the elastic member 115, the image reading unit 10 is elastically supported on the first fixed supporting portions 111b and the second fixed supporting portion 113a, and consequently, may maintain an original flatness thereof regardless of a flatness of the body frame 110.

Figure 3B:
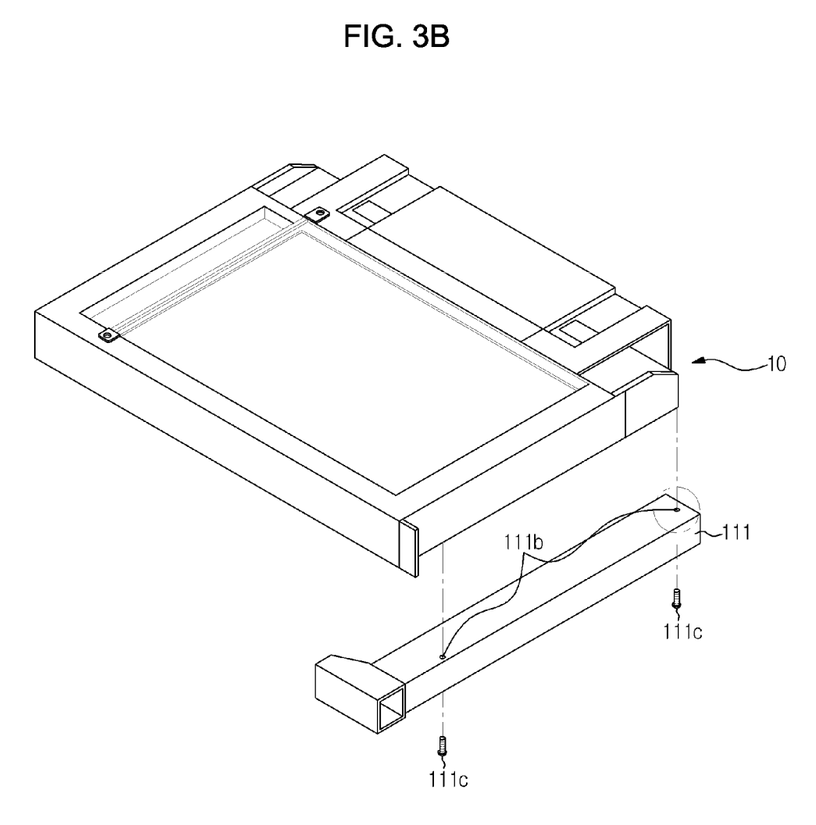
FIG. 3B is an exploded view of a image reading unit coupled to the image forming apparatus shown in FIG. 3.

Referring again to the first mounting member 111, a pair of first fixed supporting portions 111b is disposed thereon. Each of the first fixed supporting portions 111b protrude upward from an upper surface of the first mounting member 111 and respectively have a central screw-fastening hole 111a, as illustrated in FIG. 3. A screw 111c, for example, may be disposed through the body frame 110 and through each screw-fastening hole 111a and into a receptacle of the image reading unit 110 to couple the first fixed supporting portions 111b to the body frame 110, while also coupling the image reading unit 10 to the first mounting member 111, as illustrated in FIGS. 2 and 3B.

The fixed supporting member 113 includes a second fixed supporting portion 113a that extends laterally from a lateral surface of the second mounting member 112 and thus, serves to support a lower surface of the image reading unit 10. In at least one exemplary embodiment, the second fixed supporting portion 113a integrally extends from a fixed supporting member 113 fixed to the lateral surface of the second mounting member 112. That is, the fixed supporting member 113 may be formed integrally with the second mounting member 112 via injection molding such that the fixed supporting member 113 is integral with second mounting member 112.

The unfixed supporting member 114 is coupled to the second mounting member 112 of the body frame 110 and is moveable in a vertical direction. The unfixed supporting portions 114b and 114c extend laterally from the unfixed supporting member 114, such that the lower surface of the image reading unit 10 is supported on upper surfaces of the unfixed supporting portions 114b and 114c. The unfixed supporting member 114, as described above, is elastically supported by the body frame 110 via the elastic member 115. In at least one exemplary embodiment, a pair of the unfixed supporting portions 114b and 114c may be arranged respectively at opposite positions of the unfixed supporting member 114.

Figure 5:
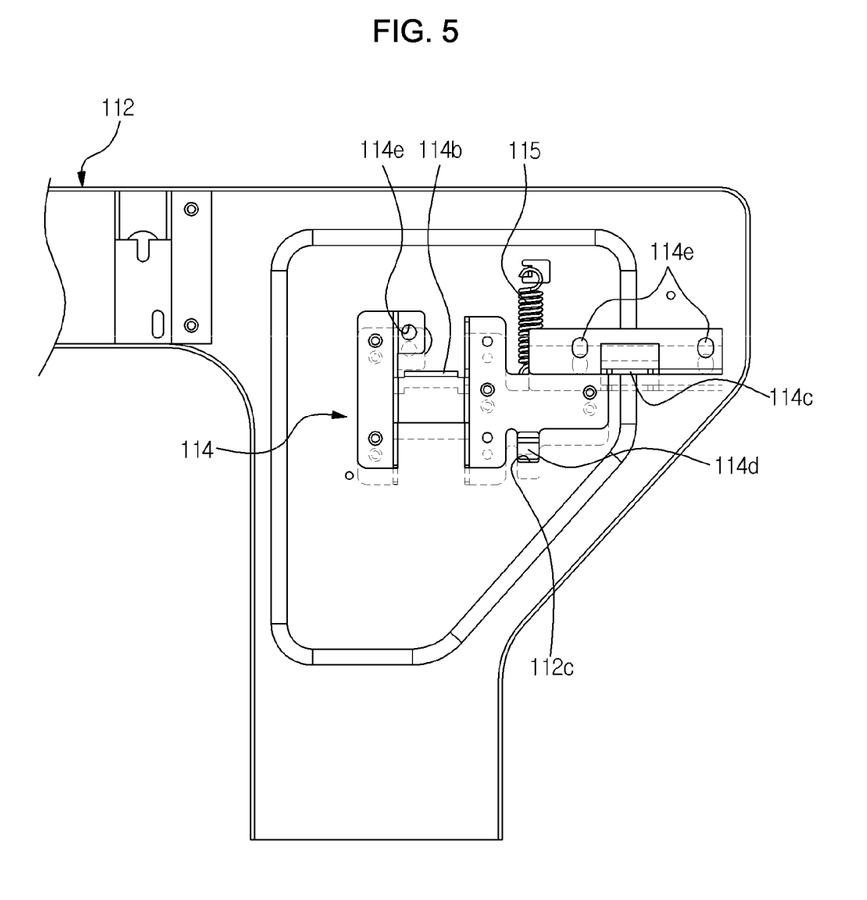
FIG. 5 is a perspective view illustrating displacement of the unfixed supporting member included in the image forming apparatus according to the embodiment of the present general inventive concept.

To guide vertical movement of the unfixed supporting member 114, the second mounting member 112 of the body frame 110 has a plurality of vertically extending guide holes 112a, and the unfixed supporting member 114 has guide protrusions 114a to be inserted into the plurality of guide holes 112a respectively, and may move in a vertical direction. Accordingly, the unfixed supporting member 114, as illustrated in FIG. 5, is vertically movably mounted to the second mounting member 112 and acts to elastically support a position adjacent a corner included on the side opposite the side being supported by the first mounting member. Accordingly, the image reading unit 10 may be supported upward owing to the elastic restoration force of the elastic member 115.

In addition, to stably keep the unfixed supporting member 114 mounted to the body frame 110, the second mounting member 112 has a retention hole 112c and the unfixed supporting member 114 has a retention piece 114d. The retention piece 114d integrally extends from the unfixed supporting member 114. The retention piece 114d is configured to penetrate through the retention hole 112c to thereby be caught at a position adjacent to the retention hole 112c. In this case, the retention piece 114d extends vertically such that a vertical length of the retention piece 114d is longer than a vertical length of the retention hole 112c. With this exemplary configuration, the retention piece 114d may be continuously caught at the position adjacent to the retention hole 112c in a state wherein a lateral surface of the unfixed supporting member 114 is arranged parallel to the lateral surface of the second mounting member 112 under the influence of the elastic restoration force of the elastic member 115. This may prevent the unfixed supporting member 114 from being separated from the second mounting member 112.

The unfixed supporting member 114 may further have a plurality of fastening holes 114e to allow the unfixed supporting member 114 to be fastened with the image reading unit 10 by use of screws. Similarly, the second mounting member 112 has through-holes 112b to fasten via, for example, screws. Thus, screws penetrating through the second mounting member 112 may be fastened into the fastening holes 114e of the unfixed supporting member 114.

Therefore, according to at least one exemplary embodiment described above, a first mounting member 111 and a second mounting member 112 are positioned opposite each other to support opposite sides of the image reading unit 10. The first fixed supporting portions 111b included with the first mounting member 111 support two corners, respectively, of one side of the image reading unit 10. The second fixed supporting portion included with the fixed supporting member 113 of the second mounting member 112 supports one corner of the opposite side of the image reading unit 110. The unfixed supporting member 114 is moveable in a vertical direction via the elastic member 115 to support the remaining corner of the opposite side of the image reading unit 10. Accordingly, the corner supported by the unfixed supporting member 114 is elastically supported in an upward direction, and may preserve the flatness of the image reading unit 10 during installation to the image forming apparatus 100.

Although at least one exemplary embodiment illustrates that the three positions of the image reading unit 10 are supported in a stationary manner by the body frame 110 via the first fixed supporting portions 111b, the second fixed supporting member 113a, while the single position of the image reading unit 10 is movably supported via the unfixed supporting portions 114b and 114c, it is not limited thereto. In an alternative embodiment, a plurality of positions of the image reading unit 10 may be supported in a stationary manner by the body frame 110 via a plurality of fixed supporting portions 111b and 113a, and one or more positions of the image reading unit 10 may be movably supported by the body frame 110 via the unfixed supporting portions 114b and 114c. Even in this case, substantially the same operational effects may be obtained.

As is apparent from the above description, an image reading unit according to an exemplary embodiment of the present general inventive concept may be mounted to a body frame of an image forming apparatus by use of a plurality of fixed supporting portions and at least one unfixed supporting portion. This mounting configuration may prevent the flatness of the image reading unit from being deteriorated when the image reading unit is mounted to the body frame.

Although a few exemplary embodiments of the present general inventive concept have been shown and described, it would be appreciated by those skilled in the art that changes may be made in these exemplary embodiments without departing from the principles and spirit of the general inventive concept, the scope of which is defined in the claims and their equivalents.

What is claimed is:

1. An image forming apparatus comprising a body frame and an image reading unit mounted to the body frame, the image forming apparatus further comprising:
- a first mounting member provided at one side of the body frame, to which one side of the image reading unit is mounted;
- a second mounting member provided at the other side of the body frame, to which the other side of the image reading unit is mounted;
- a plurality of fixed supporting portions to support the image reading unit in a stationary manner, the fixed supporting portions include first fixed supporting portions arranged on an upper surface of the first mounting member and second fixed supporting portion fixed to a lateral surface of the second mounting member;
- an unfixed supporting member coupled to the second mounting member in a vertically movable manner to moveably support one side of the image reading unit in a vertical direction; and
- an elastic member to elastically support the unfixed supporting member in the vertical direction,
- wherein the unfixed supporting member includes at least one unfixed supporting portion extending laterally from the unfixed supporting member to support a lower surface of the image reading unit and a retention piece extending from the unfixed supporting member and adapted to penetrate through a retention hole formed in the body frame.

2. The image forming apparatus according to claim 1, wherein a pair of the first fixed supporting portions is spaced apart from each other on the upper surface of the first mounting member.

3. The image forming apparatus according to claim 1, wherein the unfixed supporting member includes at least one unfixed supporting portion extending laterally from the unfixed supporting member to support a lower surface of the image reading unit.

4. The image forming apparatus according to claim 3, wherein the at least one unfixed supporting portion includes a pair of unfixed supporting portions provided respectively at opposite sides of the unfixed supporting member to support two positions of the lower surface of the image reading unit.

5. The image forming apparatus according to claim 3, further comprising:
- a guide hole vertically formed in the body frame; and
- a guide protrusion protruding from the unfixed supporting member so as to be inserted into the guide hole.

6. The image forming apparatus according to claim 3, further comprising:
- a retention hole formed in the body frame; and
- a retention piece extending from the unfixed supporting member and adapted to penetrate through the retention hole to thereby be caught at a position adjacent to the retention hole,
- wherein the retention piece has a vertical length longer than a vertical length of the retention hole.

7. The image forming apparatus according to claim 1, wherein the elastic member includes a coil spring, an upper end that is coupled to the body frame and a lower end that is coupled to the unfixed supporting member to elastically support the unfixed supporting member.

8. An image forming apparatus comprising a body frame and an image reading unit mounted to the body frame, the image forming apparatus further comprising:
- a first mounting member provided at the body frame to be mounted against one side of the image reading unit;
- a second mounting member provided at the body frame to be mounted to the other side of the image reading unit;
- a fixed supporting member fixed to the second mounting member;
- three fixed supporting portions provided at the body frame to support three positions of the image reading unit, respectively, in a stationary manner, the fixed supporting portions include first fixed supporting portions protruding upward from opposite positions of an upper surface of the first mounting member and second fixed supporting portion extending laterally from the fixed supporting member to support a lower surface of the image reading unit;
- an unfixed supporting member coupled to the second mounting member in a vertically movable manner to moveably support one side of the image reading unit in a vertical direction; and
- an elastic member to elastically support the unfixed supporting member in the vertical direction,
- wherein the unfixed supporting member includes at least one unfixed supporting portion extending laterally from the unfixed supporting member to support a lower surface of the image reading unit and a retention piece extending from the unfixed supporting member and adapted to penetrate through a retention hole formed in the body frame.

9. The image forming apparatus according to claim 8 wherein the first fixed supporting portions each has a central fastening hole.

10. The image forming apparatus according to claim 8, wherein the unfixed supporting member includes at least one unfixed supporting portion extending from the unfixed supporting member to support a lower surface of the image reading unit.

11. An image forming apparatus including a body frame to support an image reading unit, comprising:
- an elastic member having a first end coupled to the body frame; and
- an unfixed supporting member coupled to a second end of the elastic member to elastically support a corner of the image reading unit in a vertical direction such that the elastic support in the vertical direction causes movement of the unfixed supporting member in the vertical direction,
- wherein the unfixed supporting member includes at least one unfixed supporting portion extending laterally from the unfixed supporting member to support a lower surface of the image reading unit and a retention piece extending from the unfixed supporting member and adapted to penetrate through a retention hole formed in the body frame.

12. An image forming apparatus including a body frame to support an image reading unit, comprising:
- a first mounting member coupled to the body frame to support a first side of the image reading unit;
- a support arm coupled to the body frame opposite from the first mounting member to support a second side of the image reading unit that is opposite the first side; and
- an unfixed supporting member coupled to the support arm and elastically moveable in a vertical direction to elastically support a corner of the second side of the image reading unit such that the elastic support causes movement of the unfixed supporting member in the vertical direction, wherein the unfixed supporting member includes at least one unfixed supporting portion extending laterally from the unfixed supporting member to support a lower surface of the image reading unit and a retention piece extending from the unfixed supporting member and adapted to penetrate through a retention hole formed in the body frame.

13. A support arm of an image forming unit having a body frame to support a side of an image reading unit, comprising:
a fixed supporting member formed integrally with the support arm and including a fixed support portion to support a first corner of the side of the image reading unit; and
an unfixed supporting member coupled to the support arm and elastically moveable in a vertical direction to elastically support a second corner of the side of the image reading unit different from the first corner such that the elastic support causes movement of the unfixed supporting member in the vertical direction,
wherein the unfixed supporting member includes at least one unfixed supporting portion extending laterally from the unfixed supporting member to support a lower surface of the image reading unit and a retention piece extending from the unfixed supporting member and adapted to penetrate through a retention hole formed in the body frame.

14. The support arm of claim 13, further comprising an elastic member having a first end coupled to be coupled to a frame of the image forming unit and having a second end coupled to the unfixed supporting member to elastically support the unfixed supporting member in a vertical direction.

15. An image forming apparatus, comprising:
a body frame having an image forming unit and at least one supporting member including fixed supporting portions formed thereon and an unfixed supporting portion; and
a reading unit disposed on the at least one supporting member of the body frame and fixedly coupled to the fixed supporting portions and moveably coupled to the unfixed supporting portion in a vertical direction with respect to the body frame,
wherein the unfixed supporting member includes at least one unfixed supporting portion extending laterally from the unfixed supporting member to support a lower surface of the reading unit and a retention piece extending from the unfixed supporting member and adapted to penetrate through a retention hole formed in the body frame.

* * * * *